(12) United States Patent
Gopal et al.

(10) Patent No.: US 9,461,816 B2
(45) Date of Patent: Oct. 4, 2016

(54) METHODS, SYSTEMS AND APPARATUS TO REDUCE PROCESSOR DEMANDS DURING ENCRYPTION

(71) Applicant: Intel Corporation, Santa Clara, CA (US)

(72) Inventors: Vinodh Gopal, Westborough, MA (US); Erdinc Ozturk, Marlborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 13/727,141

(22) Filed: Dec. 26, 2012

(65) Prior Publication Data

US 2014/0177823 A1 Jun. 26, 2014

(51) Int. Cl.
| | | |
|---|---|---|
| H04L 29/00 | (2006.01) | |
| H04L 9/06 | (2006.01) | |
| G06F 9/00 | (2006.01) | |
| G06F 21/00 | (2013.01) | |

(52) U.S. Cl.
CPC .............. *H04L 9/0637* (2013.01); *G06F 9/00* (2013.01); *G06F 21/00* (2013.01); *H04L 2209/12* (2013.01)

(58) Field of Classification Search
CPC .................................................... H04L 9/0637
See application file for complete search history.

(56) References Cited

U.S. PATENT DOCUMENTS

2008/0240421 A1 10/2008 Gopal et al.

OTHER PUBLICATIONS

Shay Gueron and Michael Kounavis, "Intel® Carry-Less Multiplication Instruction and its Usage for Computing the GCM Mode", White Paper, May 2010 found in URL "http://cqcontent.intel.com/content/dam/www/public/us/en/documents/white-papers/carry-less-multiplication-instruction-in-gcm-mode-paper.pdf".*
Erdinc Ozturk and Vinodh Gopal, "Enabling High-Performance Galois-Counter-Mode on Intel® Architecture Processors", White Paper, Oct. 2012 found in URL "http://www.intel.com/content/dam/www/public/us/en/documents/software-support/enabling-high-performance-gcm.pdf".*
"PSHUFB—Packed Shuffle Bytes," http://www.felixcloutier.com/x86/PSHUFB.html, retrieved from the internet on May 20, 2015, 3 pages.
Wikipedia, "Advanced Encryption Standard," retrieved from Wikipedia on Nov. 1, 2012, 10 pages.
Rott, Jeffrey, Intel® Advanced Encryption Standard Instructions (AES-NI), Feb. 2, 2012, 5 pages.
Intel, "Download the Intel AESNI Sample Library," retrieved from http://software.intel.com/en-us/articled/download-the-intel-aesni-sample-library on Jul. 12, 2012, 1 page.
Wikipedia, "Block Size (cryptography)," retrieved from Wikipedia on Nov. 1, 2012, 1 page.
Davies, Joe, "Chapter 13—Internet Protocol Security and Packet Filtering," published Dec. 27, 2005, updated Apr. 19, 2006, 20 pages.

(Continued)

*Primary Examiner* — Saleh Najjar
*Assistant Examiner* — Simon Kanaan
(74) *Attorney, Agent, or Firm* — Hanley, Flight & Zimmerman, LLC

(57) ABSTRACT

Methods and apparatus are disclosed to reduce processor demands during encryption. A disclosed example method includes detecting a request for the processor to execute an encryption cipher determining whether the encryption cipher is associated with a byte reflection operation, preventing the byte reflection operation when a buffer associated with the encryption cipher will not cause a carryover condition, and incrementing the buffer via a shift operation before executing the encryption cipher.

25 Claims, 7 Drawing Sheets

(56) References Cited

OTHER PUBLICATIONS

Wikipedia, "Cipher," retrieved from Wikipedia on Dec. 2, 2012, 5 pages.
Saarinen, Markku-Juhani O., "Cycling Attacks on GCM, GNASH and Other Polynomial MACs and Hashes," © 2012, 9 pages.
Intel, "Fast Cryptographic Computation on Intel® Architecture Processors Via Function Stitching," Apr. 2010, 19 pages.
Wikipedia, "Galois/Counter Mode," retrieved from Wikipedia on Nov. 5, 2012, 5 pages.
Stephenson, Brad, "IPsec: Security Across the Protocol Stack," CSCI NetProg, 27 pages.
Wikipedia, "IPsec," retrieved from Wikipedia on Nov. 5, 2012, 7 pages.
Intel, "Optimized Galois-Counter-Mode Implementation on Intel® Architecture Processors," Aug. 2010, 23 pages.
Dworkin, Morris, Recommendation for Block Cipher Modes of Operation: Galois/Counter Mode (GCM) and GMAC, NIST, Nov. 2007, 39 pages.

* cited by examiner

UINT8 index = msb (CTR)  ⟵ 402
for (i = 0; i < buffer_size < i++)  ⟵ 404
{
    if (index == 0xFF)  ⟵ 406

418 {
        CTR = byte_reflect(CTR)
        CTR = CTR+1
        CTR = byte_reflect(CTR)
        xmm1 = AES (CTR, Key)
        xmm1 = xmm1 XOR plaintext
        index = 0 else
    408 {
        CTR = CTR + 1 (1<<(128-8))  ⟵ 410
        xmm1 = AES(CTR,Key)  ⟵ 412
        xmm1 = xmm1 XOR plaintext  ⟵ 414
        index = (index + 1) mod 0x100  ⟵ 416
}

FIG. 4

METHODS, SYSTEMS AND APPARATUS TO REDUCE PROCESSOR DEMANDS DURING ENCRYPTION

FIELD OF THE DISCLOSURE

This disclosure relates generally to encryption, and, more particularly, to methods, systems and apparatus to reduce processor demands during encryption.

BACKGROUND

Computing systems are faced with obligations to provide data security services, such as one or more encryption services and/or authentication services. Encryption services are typically performed by one or more algorithm ciphers, which may employ one or more keys to convert information from plain text into ciphertext. A trusted and widely adopted block-type symmetric-key cipher is the Advanced Encryption Standard (AES) cipher that was adopted by the U.S. Government. The AES cipher may introduce a significant amount of computing system burden when performing its iterative cycles of ciphertext generation. Such computing system burdens may be further exacerbated based on a size of the key.

Computing systems may also employ authentication services together with the encryption and/or decryption services. The Galois Counter Mode (GCM) combines encryption with authentication in a manner that takes advantage of parallel operation(s) of the computing system on which it operates.

BRIEF DESCRIPTION OF THE DRAWINGS

FIG. 4 is example pseudo code implementing an example cipher algorithm to reduce processor demands during encryption consistent with the teachings of this disclosure.

DETAILED DESCRIPTION

The combination of data security and authentication may be realized on a computing system by way of the Galois Counter Mode (GCM) block cipher mode. Such combinations are particularly important to one or more services used by the computing system, such as Internet Protocol (IP) security applications (IPSec) and applications for secure virtual private network (VPN) connectivity. IPSec secures IP communication by, in part, authenticating and encrypting each IP packet of a communication session.

When performing both cipher operations for data security and authentication operations, the architectural resources of the computing system become burdened when working on blocks of input data. Because the GCM operation causes a relatively high operations-per-cycle retirement rate, and uses most or all available processor registers, parallelized optimizations are pushed to a finite level of availability. In other words, further parallelization may not be possible and/or yield anything other than negligible boosts in GCM performance.

Some services and/or operations performed by the computing system operate with registers weighted in a manner inconsistent with GCM. For example, an example service invoked to be executed by the computing system may establish a most significant bit (MSB) and a least significant bit (LSB) in a manner opposite to that employed by GCM. In such circumstances, byte reflection is performed to switch register weights in a manner that facilitates consistent operation. When applying GCM to applications that require byte reflection, such as IPSec, the data security (cipher) services must also be tailored to work with the byte reflected applications. In other words, the manner in which data is stored in the processor architecture and the manner in which data is stored in the memory does not match in view of MSB and LSB orientation. To bring the orientation in alignment for data security operation(s), such as application of Advanced Encryption Standard (AES) operations, inputs to the algorithm must be byte-reflected. The AES was published by the National Institute of Standards and Technology (NIST) as a standard that employs a secret key system via symmetric block ciphers for encryption and/or decryption operations. Encryption operations (e.g., cipher operations) perform a series of transformations using the secret key (e.g., cipher key) to transform intelligible data (plaintext) into an unintelligible form (e.g., ciphertext). For cipher applications requiring byte reflection, if input bytes were ordered from 15 to 0, then byte reflection re-orients the bytes from 0 to 15.

Figure 1:
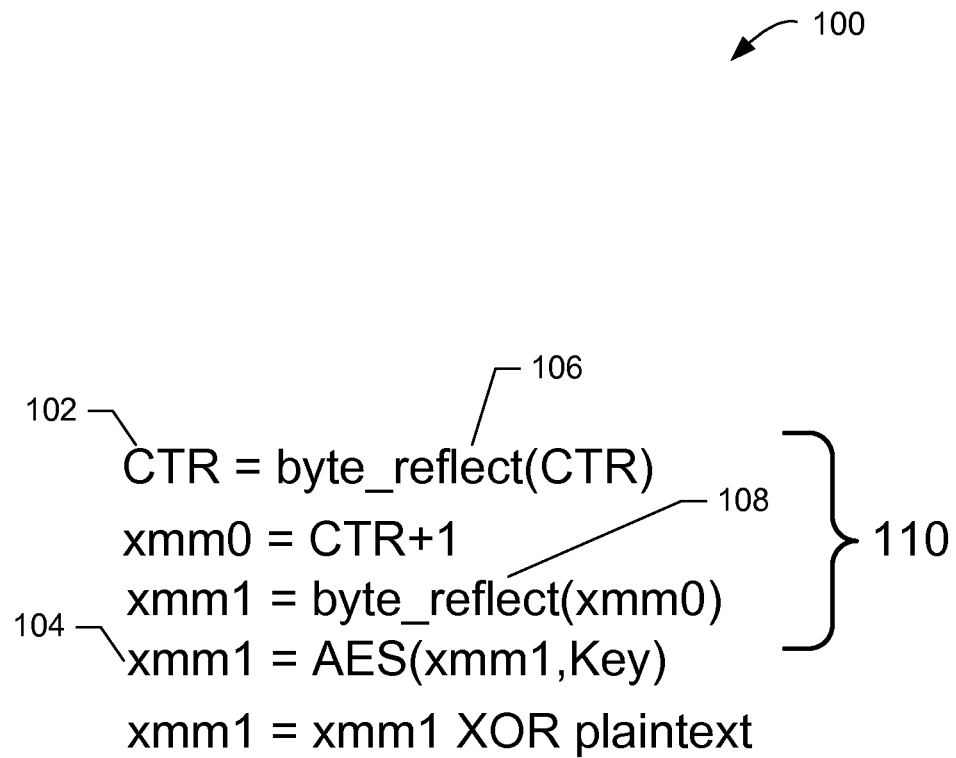
FIG. 1 is example pseudo code implementing an example cipher algorithm to facilitate byte reflection with an encryption cipher.

In the illustrated example of FIG. 1, pseudo code 100 implementing an AES algorithm is shown for an application associated with IPSec. The example AES algorithm includes a counter "CTR" for its operation, in which the input "CTR" 102 must be byte reflected. AES in GCM works on byte-reflected values, but the counter mode aspect of GCM operates in normal form (e.g., a byte orientation opposite to that employed by AES). As such, the input counter 102 is converted into a normal byte order, incremented, and then byte-reflected back for AES encryption. In other words, prior to using the byte reflected data with a call to the AES cipher 104, two byte reflection operations occur 106, 108. Additional IPSec requirements include a need to add one to the MSB of the initial counter input.

Byte reflection may be accomplished via a "pshufb" instruction, which rearranges bytes. While byte reflection operation efficiency may be improved via a "pshufb" instruction, which can operate using one clock cycle, such "pshufb" instructions are resource intensive and employed during every block iteration of an input buffer. Three separate instructions occur 110 before each call to the AES cipher 104, and such calls occur within a critical path of processor operation.

Figure 2:
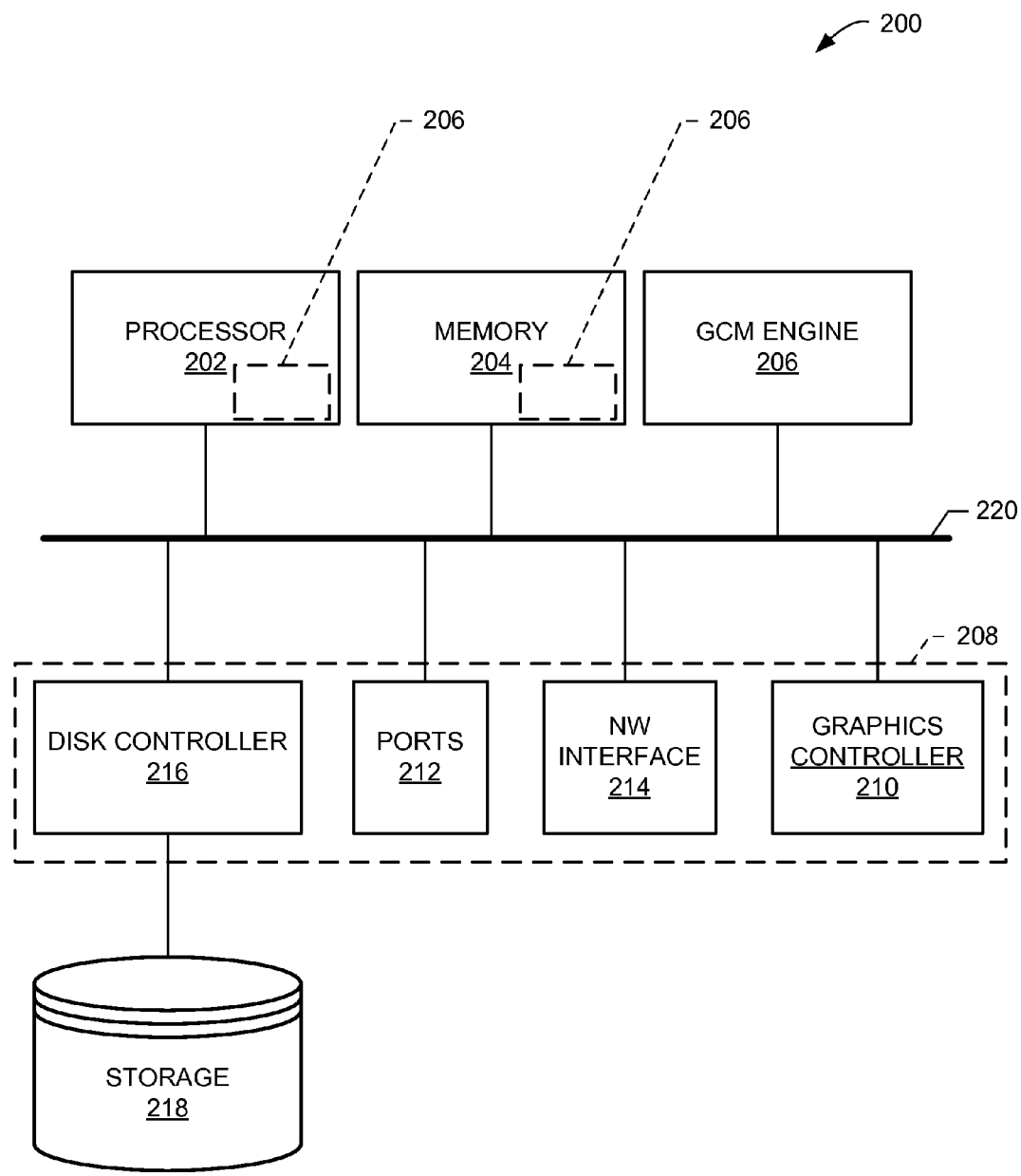
FIG. 2 is a schematic illustration of a portion of an example processor platform to reduce processor demands during encryption consistent with the teachings of this disclosure.

FIG. 2 illustrates a portion of an example processor platform 200 that includes processor(s) 202, memory 204, a GCM engine 206, and other hardware 208, such as a graphics controller 210, ports 212, a network interface 214, and a disk controller 216, which may be connected to one or more storage devices 218. The example network interface 214 of FIG. 2 may employ and/or otherwise require IPSec services when establishing VPN connections. While the example GCM engine 206 is illustrated in FIG. 2 as communicatively connected to a bus 220, the example GCM engine 206 may be, instead, integrated within the processor 202 and/or the memory 204.

In operation, the example GCM engine 206 monitors the platform 200 for an instance of security services in which one or more byte reflect operations may be needed. In some examples, the network interface 214 invokes a request to the processors 202 for security services. Such a request may include one or more IPSec requests. As described in further detail below, the example GCM engine 206 of FIG. 2 responds to the one or more byte reflect operations in a manner that reduces processing demands on the example processors 202 during security services, such as encryption.

Figure 3:
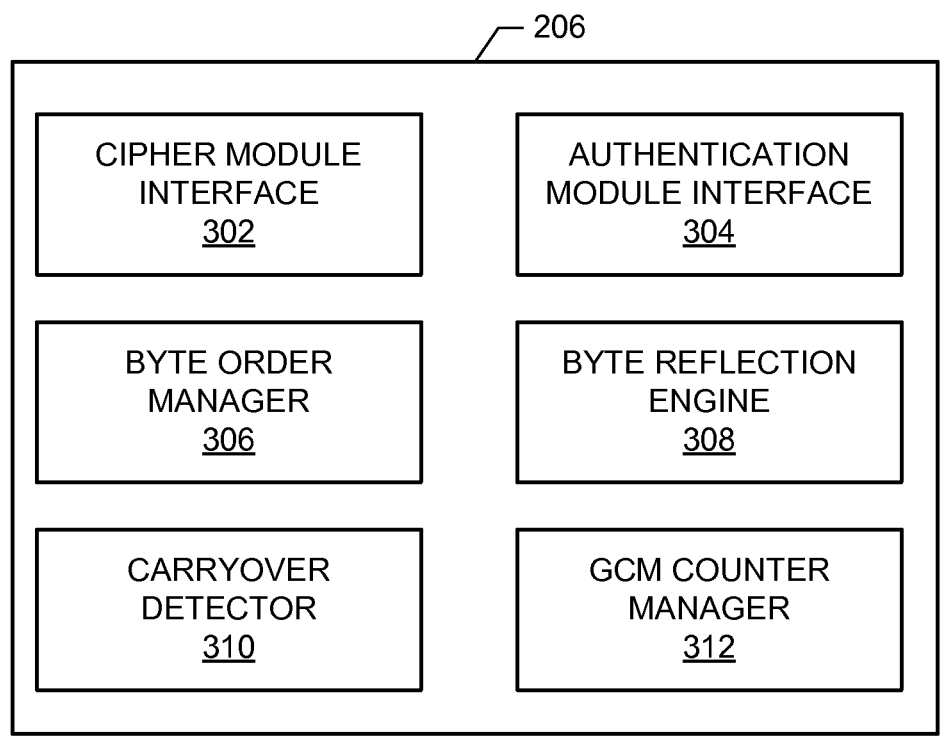
FIG. 3 is a schematic illustration of an example GCM engine of FIG. 2.

FIG. 3 is a schematic illustration of an example implementation of the example GCM engine 206 of FIG. 2. In the illustrated example of FIG. 3, the GCM engine 206 includes a cipher module interface 302, an authentication module interface 304, a byte order manager 306, a byte reflection engine 308, a carryover detector 310, and a GCM counter manager 312. In operation, the example byte order manager 306 monitors the processors 202 for one or more service requests related to an operation that requires byte reflection. In the event one or more security services do not require byte reflection, then the example byte order manager invokes default data security and/or authentication services from one or more ciphers and/or authentication modules. On the other hand, in the event the example byte order manager 306 identifies that one or more security services require byte reflection, then the example cipher module interface 302 and/or the example authentication module interface 304 invoke corresponding ciphers and/or authentication algorithms, respectively. For example, GCM services parallelize AES encryption with the GHASH hash-based authentication component.

FIG. 4 illustrates pseudo code implementing an example AES algorithm 400 to reduce processor demands during encryption. In the illustrated example of FIG. 4, the byte order manager 306 identifies the MSB of a counter of the GCM (402), and sets an input buffer index value "index" to the MSB position (404). The example carryover detector 310 determines whether the buffer index will have a carry at its next iteration of the counter block input (406). In some examples, the carryover condition is identified by comparing the MSB of the buffer with a maximum block size of the counter. If a carryover will not occur, then the example methods, systems and apparatus disclosed herein to reduce processor demands during encryption allow the AES cipher to operate without employing pshufb instructions (408), thereby reducing a corresponding processor 202 load. In some examples, reducing the processor load includes replacing the pshufb instructions with one or more logical shift operations (e.g., left-shift operator(s) "<<", right-shift operator(s) ">>", bitwise operator(s), arithmetic shift(s), logical shift(s), etc.), which requires substantially fewer computational demands of the processor 202.

If the example carryover detector 310 determines that the GCM input buffer will not invoke a carryover at a next iteration of the counter block input (406), then the example GCM counter manager 312 adds a value of 1 to the MSB of the GCM counter "CTR" (410). The shifted counter value is applied to the cipher (e.g., AES) by the example cipher module interface 302. The example cipher module interface 302 uses a key to calculate a cipher output string (412). The cipher output string is XORed with plaintext to generate ciphertext (414). The example byte order manager 306 increments the input buffer index value (416) so that the next block iteration may be tested for the possibility of a carry overflow (406).

In the event of a carry overflow (406), the example byte order manager 306 invokes traditional techniques to apply the cipher (e.g., AES) for data security (418). In particular, byte reflection operations require at least two pshufb operations, as described above in connection with FIG. 1. At least one benefit of the AES algorithm 400 of FIG. 4 is that the relatively processor intensive pshufb operations only occur one time per block for a given block size. For example, a block size of 256 may employ the AES cipher without pshufb operations for 255 iterations of the block, thereby relieving the example processor platform 200 of a substantial computational burden (e.g., reducing the load from 256 pshfb operations to one).

While an example manner of implementing the example platform 200 and/or the example GCM engine 206 to reduce processor demands during encryption has been illustrated in FIGS. 2-4, one or more of the elements, processes and/or devices illustrated in FIGS. 2-4 may be combined, divided, re-arranged, omitted, eliminated and/or implemented in any other way. Further, any or all of the example GCM engine 206, the example cipher module interface 302, the example authentication module interface 304, the example byte order manager 306, the example byte reflection engine 308, the example carryover detector 310 and/or the example GCM counter manager 312 of FIGS. 2 and 3 may be implemented by hardware, software, firmware and/or any combination of hardware, software and/or firmware. Thus, for example, any of the example GCM engine 206, the example cipher module interface 302, the example authentication module interface 304, the example byte order manager 306, the example byte reflection engine 308, the example carryover detector 310 and/or the example GCM counter manager 312 of FIGS. 2 and 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example GCM engine 206, the example cipher module interface 302, the example authentication module interface 304, the example byte order manager 306, the example byte reflection engine 308, the example carryover detector 310 and/or the example GCM counter manager 312 of FIGS. 2 and 3 are hereby expressly defined to include a tangible computer readable storage medium such as a memory, DVD, CD, Blu-ray, etc. storing the software and/or firmware. Further still, the example platform 200 of FIG. 2 and the example GCM engine 206 of FIGS. 2 and 3 may include one or more elements, processes and/or devices in addition to, or instead of, those illustrated in FIGS. 2-4, and/or may include more than one of any or all of the illustrated elements, processes and devices.

Figure 5:
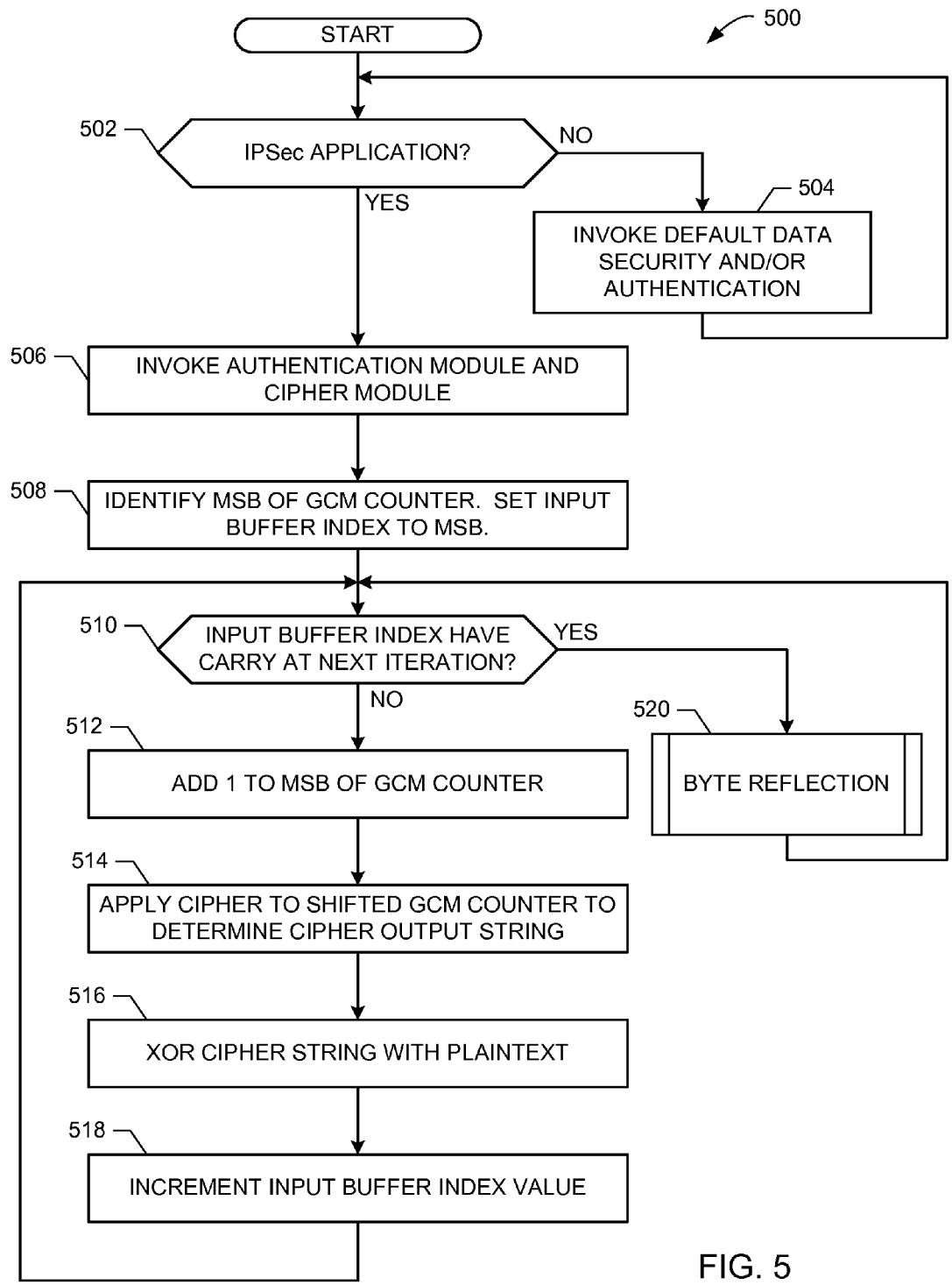
FIGS. 5 and 6 are flowcharts representative of example machine readable instructions which may be executed to reduce processor demands during encryption.
Figure 6:
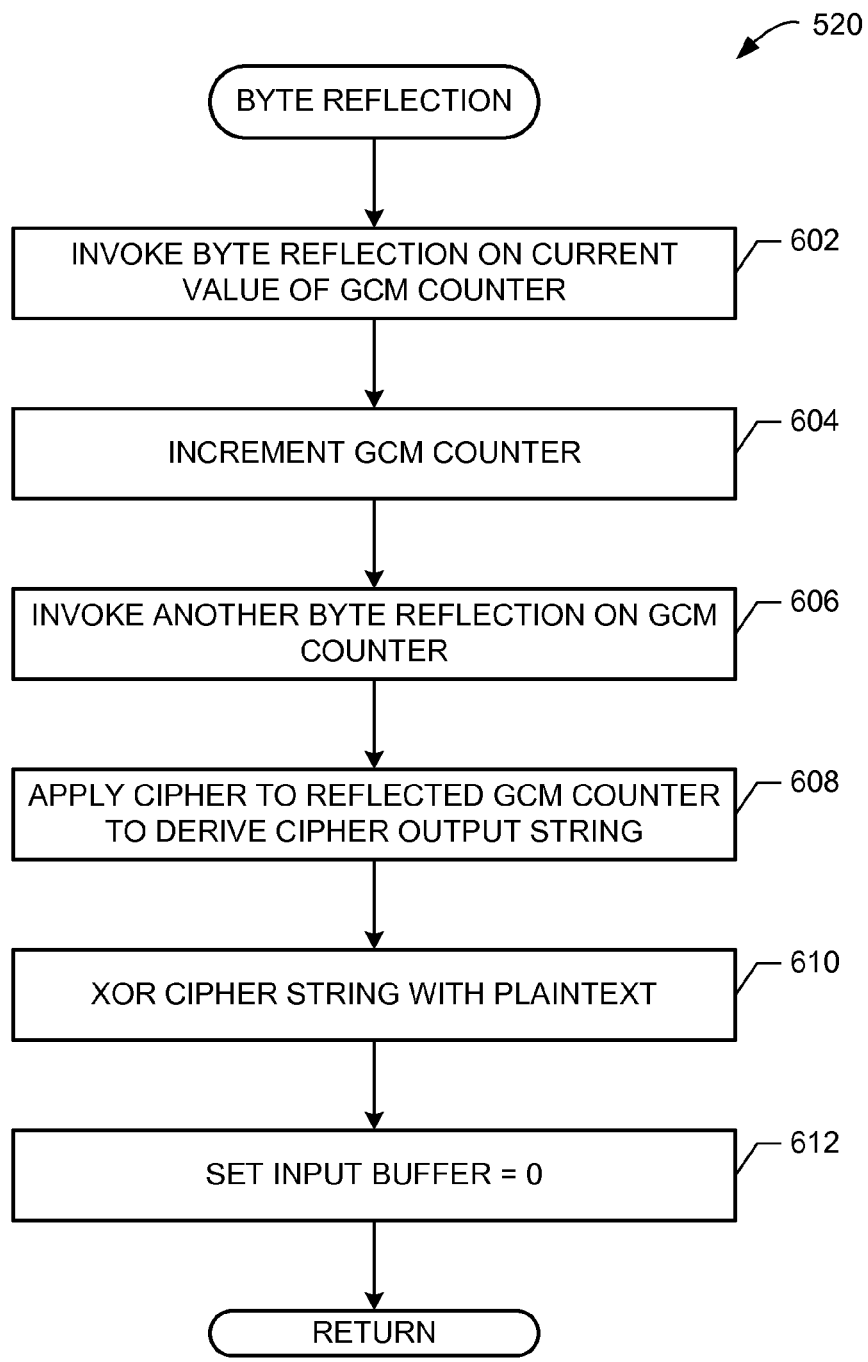

Flowcharts representative of example machine readable instructions for implementing the platform 200 of FIG. 2, the example GCM engine 206 of FIGS. 2 and 3 and/or the example AES algorithm 400 of FIG. 4 are shown in FIGS. 5 and 6. In this example, the machine readable instructions comprise a program for execution by a processor such as the processor 712 shown in the example computer 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and 6, many other methods of implementing the example platform 200, the example GCM engine 206 and the example AES algorithm to reduce processor demands during encryption may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device and/or storage disc in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc and to exclude propagating signals. Additionally or alternatively, the example processes of FIGS. 5 and 6 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disc and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 500 of FIG. 5 begins at block 502 where the example byte order manager 306 determines whether one or more security operations associated with byte reflection are to be processed by the example processor 202. If not, then the example byte order manager 306 invokes default data security and/or authentication services (block 504). However, in the event that the byte order manager 306 determines that operations requiring byte reflection have been invoked and/or are otherwise to be executed by the processor 202 (block 502), then the example cipher module interface 302 and the example authentication module interface 304 are invoked to begin GCM operations (block 506).

The example byte order manager 306 identifies the MSB of a counter of the GCM engine 206 and sets a buffer index value to the MSB position (block 508). If the example carryover detector 310 determines that the buffer index value will not experience a carry at its next iteration (block 510), then the example GCM counter manager 312 adds 1 to the MSB of the GCM counter (block 512). The example cipher module interface 302 applies the cipher to the incremented (e.g., incremented by a byte shift operation) GCM counter to determine an output string (block 514), and XORs the cipher string with plain text to generate ciphertext (block 516). The example byte order manager 306 increments the buffer index value by 1 (block 518) and control returns to block 510 to determine whether a carryover will occur.

In the event a carryover will occur at the next iteration (block 510), the example byte reflection engine initializes byte reflection operations (block 520). Example byte reflection operations are illustrated in FIG. 6. In the illustrated example of FIG. 6, the byte reflection engine 308 invokes a byte reflection operation by way of a pshufb operation on the current value of the GCM counter (block 602). The example GCM counter manager 312 increments the GCM counter (block 604) and the example byte reflection engine 308 invokes another pshufb operation to byte reflect the GCM counter (block 606). The cipher (e.g., AES) is applied to the reflected GCM counter by the example cipher module interface 302 to derive a cipher output string (block 608), and the cipher string is XORed with plaintext (block 610). Because byte reflection via pshufb operations/instructions only occurs during instances of block carryover, the example byte order manager 306 resets the input buffer value to zero (block 612), and control returns to block 510 of FIG. 5 to determine whether the next iteration of another input buffer value (e.g., from a requesting IPsec operation) will cause a carry.

Figure 7:
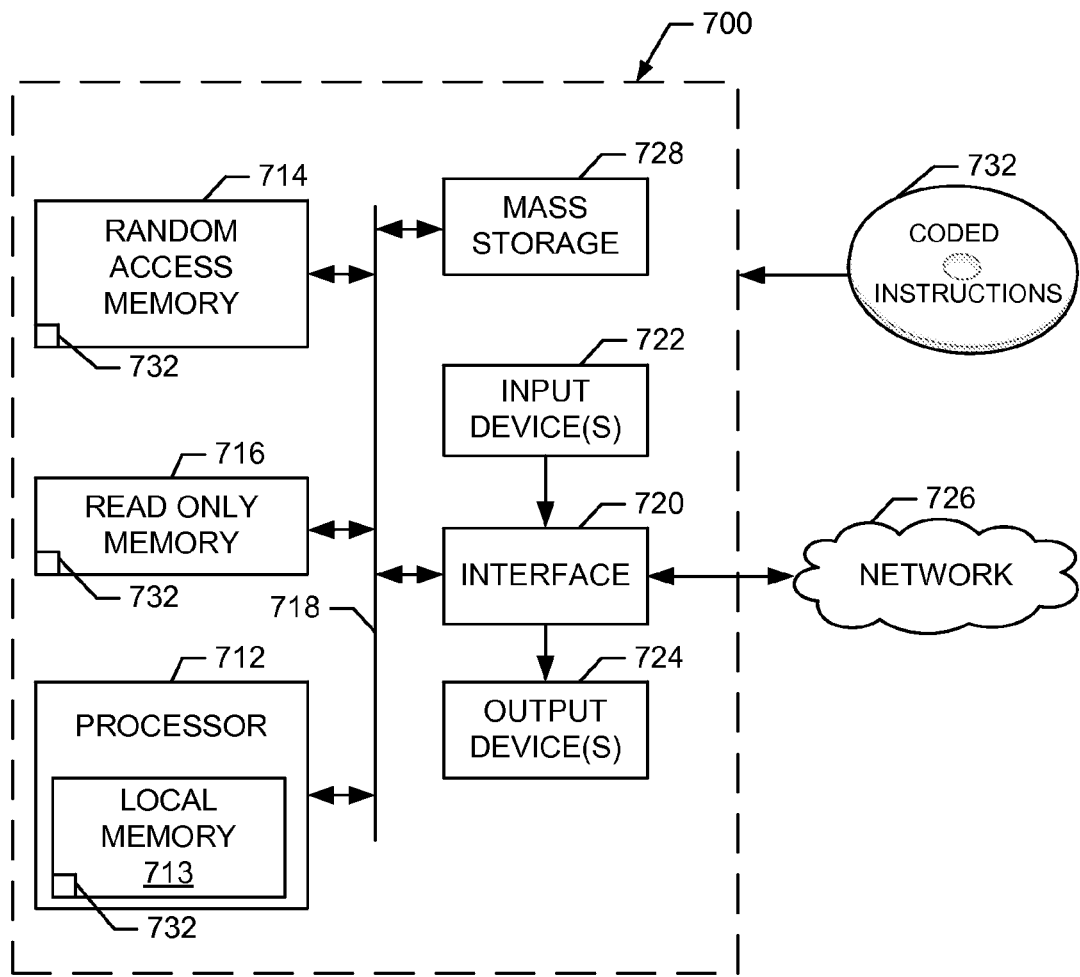
FIG. 7 is a schematic illustration of an example processor platform that may execute the instructions of FIGS. 5 and 6 to implement the example systems and apparatus of FIGS. 1-4.

FIG. 7 is a block diagram of an example processor platform 700 capable of executing the instructions of FIGS. 5 and 6 to implement the platform 200 of FIG. 2, the GCM engine 206 of FIGS. 2 and 3, and/or the program 400 of FIG. 4. The processor platform 700 can be, for example, a server, a personal computer, an Internet appliance, a mobile device, or any other type of computing device.

The system 700 of the instant example includes a processor 712. For example, the processor 712 can be implemented by one or more microprocessors or controllers from any desired family or manufacturer.

The processor 712 includes a local memory 713 and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device such as a modem or network interface card to facilitate exchange of data with external computers via a network 726 (e.g., an Ethernet connection, a digital subscriber line (DSL), a telephone line, coaxial cable, a cellular telephone system, etc.).

The processor platform 700 also includes one or more mass storage devices 728 for storing software and data. Examples of such mass storage devices 728 include floppy disk drives, hard drive disks, compact disk drives and digital versatile disk (DVD) drives.

The coded instructions 732 of FIGS. 5 and 6 may be stored in the mass storage device 728, in the volatile memory 714, in the non-volatile memory 716, and/or on a removable storage medium such as a CD or DVD. Methods, apparatus, systems and articles of manufacture are disclosed to reduce processor demands during encryption. Some disclosed example methods include detecting a request for the processor to execute an encryption cipher, determining whether the encryption cipher is associated with a byte reflection operation, preventing the byte reflection operation when a buffer associated with the encryption cipher will not cause a carryover condition, and incrementing the buffer via a shift operation before executing the encryption cipher. Other disclosed example methods include employing an Advanced Encryption Standard (AES) cipher as the encryption cipher. Still other disclosed example methods include byte reflection operations based on a request for Internet Protocol Security (IPSec) communication. Some disclosed example methods include associating the buffer with a Galois Counter Mode (GCM) block cipher mode, determining a most significant bit associated with the buffer, and identifying the carryover condition by comparing the most significant bit of the buffer with a maximum block size. Other disclosed example methods include replacing a pshufb operation with a logical shift operation, and applying a pshufb operation to byte reflect the buffer when the carryover condition is true.

Example apparatus to reduce processor demands during encryption include a cipher module interface to detect a request for the processor to execute an encryption cipher, a byte order manager to determine whether the encryption cipher is associated with a byte reflection operation, a carryover detector to prevent the byte reflection operation when a buffer associated with the encryption cipher will not cause a carryover condition, and a counter manager to increment the buffer via a shift operation before executing the encryption cipher. Other example disclosed apparatus include the cipher module interface to employ an Advanced Encryption Standard (AES) cipher, and the cipher module interface to identify a request for Internet Protocol Security (IPSec) communication. Some example disclosed apparatus associate the buffer with a Galois Counter Mode (GCM) block cipher mode, in which the byte order manager is to determine a most significant bit associated with the buffer. Still other example disclosed apparatus include the carryover detector to identify the carryover condition by comparing the most significant bit of the buffer with a maximum block size. Other example disclosed apparatus include the counter manager to replace a pshufb operation with a logical shift operation in response to preventing the byte reflection operation and/or the counter manager is to invoke a pshufb operation to byte reflect the buffer when the carryover condition is true.

Some disclosed example machine readable storage mediums comprising instructions that, when executed, cause a machine to detect a request for the processor to execute an encryption cipher, determine whether the encryption cipher is associated with a byte reflection operation, prevent the byte reflection operation when a buffer associated with the encryption cipher will not cause a carryover condition, and increment the buffer via a shift operation before executing the encryption cipher. Some example machine readable storage mediums include initiating an Advanced Encryption Standard (AES) cipher. Other example machine readable storage mediums include initiating a Galois Counter Mode (GCM) block cipher mode, and determining a most significant bit associated with the buffer associated with the GCM block cipher mode, and/or identifying the carryover condition by comparing the most significant bit of the buffer with a maximum block size. Some example machine readable storage mediums include replacing a pshufb operation with a logical shift operation, or applying a pshufb operation to byte reflect the buffer when the carryover condition is true.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to reduce a load on a processor, comprising:
   detecting a request for the processor to execute an encryption cipher;
   determining whether the encryption cipher is associated with a byte reflection operation;
   preventing the byte reflection operation when a buffer associated with the encryption cipher will not cause a carryover condition; and
   incrementing the buffer via a shift operation before executing the encryption cipher.

2. A method as defined in claim 1, wherein the encryption cipher includes an Advanced Encryption Standard (AES) cipher.

3. A method as defined in claim 1, wherein the byte reflection operation is based on a request for Internet Protocol Security (IPSec) communication.

4. A method as defined in claim 1, wherein the buffer is associated with a Galois Counter Mode (GCM) block cipher mode.

5. A method as defined in claim 4, further including determining a most significant bit associated with the buffer.

6. A method as defined in claim 5, wherein the carryover condition is identified by comparing the most significant bit of the buffer with a maximum block size.

7. A method as defined in claim 1, wherein preventing the byte reflection operation includes replacing a pshufb operation with a logical shift operation.

8. A method as defined in claim 1, wherein the byte reflection operation includes a pshufb operation.

9. A method as defined in claim 1, further including applying a pshufb operation to byte reflect the buffer when the carryover condition occurs.

10. A processor, comprising:
    a cipher module interface to detect a request for the processor to execute an encryption cipher;
    a byte order manager to determine whether the encryption cipher is associated with a byte reflection operation;
    a buffer associated with the encryption cipher;
    a carryover detector to prevent the byte reflection operation when the buffer will not exhibit a carryover condition; and
    a counter manager to increment the buffer via a shift operation before the encryption cipher is executed.

11. A processor as defined in claim 10, wherein the cipher module interface is to employ an Advanced Encryption Standard (AES) cipher.

12. A processor as defined in claim 10, wherein the cipher module interface is to identify a request for Internet Protocol Security (IPSec) communication.

13. A processor as defined in claim 10, wherein the buffer is associated with a Galois Counter Mode (GCM) block cipher mode.

14. A processor as defined in claim 13, wherein the byte order manager is to determine a most significant bit associated with the buffer.

15. A processor as defined in claim 14, wherein the carryover detector is to identify the carryover condition by comparing the most significant bit of the buffer with a maximum block size.

16. A processor as defined in claim 10, wherein the counter manager is to replace a pshufb operation with a logical shift operation in response to preventing the byte reflection operation.

17. A processor as defined in claim 10, wherein the byte reflection operation includes a pshufb operation.

18. A processor as defined in claim 10, wherein the counter manager is to invoke a pshufb operation to byte reflect the buffer when the carryover condition occurs.

19. A tangible computer readable storage medium comprising instructions that, when executed, cause a processor to, at least:
in response to a request for the processor to execute an encryption cipher, determine whether the encryption cipher is associated with a byte reflection operation;
prevent the byte reflection operation when a buffer associated with the encryption cipher will not exhibit a carryover condition; and
increment the buffer via a shift operation before executing the encryption cipher.

20. A tangible computer readable storage medium as defined in claim 19, wherein the instructions, when executed, cause the processor to initiate an Advanced Encryption Standard (AES) cipher.

21. A tangible computer readable storage medium as defined in claim 19, wherein the instructions, when executed, cause the processor to initiate a Galois Counter Mode (GCM) block cipher mode.

22. A tangible computer readable storage medium as defined in claim 21, wherein the instructions, when executed, cause the processor to determine a most significant bit associated with the buffer associated with the GCM block cipher mode.

23. A tangible computer readable storage medium as defined in claim 22, wherein the instructions, when executed, cause the processor to identify the carryover condition by comparing the most significant bit of the buffer with a maximum block size.

24. A tangible computer readable storage medium as defined in claim 19, wherein the instructions, when executed, cause the processor to replace a pshufb operation with a logical shift operation.

25. A tangible computer readable storage medium as defined in claim 19, wherein the instructions, when executed, cause the processor to apply a pshufb operation to byte reflect the buffer when the carryover condition occurs.

* * * * *